United States Patent [19]

Jung

[11] 4,255,503
[45] Mar. 10, 1981

[54] GALVANIC ELEMENT WITH NEGATIVE ZINC ELECTRODE

[75] Inventor: Margarete Jung, Kelkheim, Taunus, Fed. Rep. of Germany

[73] Assignee: Varta Batterie, A.G., Am Leineufer, Fed. Rep. of Germany

[21] Appl. No.: 9,118

[22] Filed: Feb. 2, 1979

[30] Foreign Application Priority Data

Feb. 24, 1978 [DE] Fed. Rep. of Germany ....... 2807980

[51] Int. Cl.$^3$ ............................................. H01M 6/04
[52] U.S. Cl. ................................... 429/201; 429/207; 429/229
[58] Field of Search ............................... 429/199–201, 429/207, 206, 229–231

[56] References Cited

U.S. PATENT DOCUMENTS

| 680,848 | 8/1901 | Erny | 429/230 X |
|---|---|---|---|
| 693,274 | 2/1902 | Johnson | 429/207 |
| 3,051,768 | 8/1962 | Kujas | 429/199 |
| 3,607,437 | 9/1971 | Minagawa | 429/199 |
| 3,885,990 | 5/1975 | Bloom et al. | 429/199 |
| 3,963,318 | 2/1976 | Cole, Jr. | 429/199 X |

*Primary Examiner*—Charles F. LeFevour

[57] ABSTRACT

The aqueous, strongly alkaline electrolyte of the element and/or one or both of the electrodes contain(s) additive of soluble chloride, sulfate, or both.

9 Claims, No Drawings

GALVANIC ELEMENT WITH NEGATIVE ZINC ELECTRODE

The invention relates to a galvanic element having a negative zinc electrode and a positive electrode which are in contact with an aqueous, strongly alkaline electrolyte.

The alkali-manganese cell is a known element of this type. Generally zinc powder is used as the material of the negative electrode. The zinc electrode is the critical active compound of the systems which are involved here because it has the property of becoming passivated during extended current draw, and rather quickly at intense loads. Generally it has been attempted to remedy this shortcoming of easy passivation primarily by increasing the specific surface. This takes place by processing of powdery electrode materials in order to reduce the current density per unit of surface. On the other hand, for zinc sheets or zinc cups, which lend themselves to much more rational manufacture of alkaline primary elements by analogy with the conventional techniques used for Leclanche' cells, the passivation problem continues to exist in its full dimensions. Accordingly, a particular concern of the present invention is the considerable freeing of zinc sheet electrodes from passivating coatings during the discharge operation.

Under anodic loading the following reactions take place at the zinc electrode in alkaline electrolyte:

$$Zn + 2OH^- = Zn(OH)_2 + 2e^- \tag{1}$$

$$Zn(OH)_2 = ZnO + H_2O \tag{2}$$

In case of great excess of lye, there initially takes place dissolution of the zinc hydroxide, or of the oxide which forms with formation of zincates.

$$Zn(OH)_2 + KOH = K[Zn(OH)_3] \tag{3}$$

For low lye concentration or supersaturation of the lye with zincate, the zinc again precipitates out as hydroxide or oxide upon further loading. This precipitation takes place for resting or fixated electrolyte in the immediate vicinity of the highest zincate enrichment, in other words, on the electrode. The coverage of the electrode is also dependent upon the current density, because more zinc is dissolved at higher current densities and the concentration equilibrium with the adjoining, less zinc-rich electrolyte does not keep pace with the zinc dissolution.

From French Pat. No. 2,033,501 there is known an alkaline electrolyte buffered with boric acid and which contains in addition to the boric acid also additives of sulfate, salts of aminosulfonic acid, chlorides, or perchlorates, the last-named being preferred.

The pH value of such an electrolyte is displaced strikingly toward the neutral point and this leads to various disadvantages.

Thus, $Zn(OH)_2$ is less soluble in such an electrolyte. Furthermore, due to the neutralization of the alkaline lye with the boric acid, there is obtained an electrolyte which has lower conductivity than the alkaline lye itself. For such a situation, German Pat. No. 690,105 recommends the use of electrodes with particularly low resistance. Particularly suitable for this are zinc electrodes in which the zinc is largely subdivided and introduced, for example, into a porous metal plate.

On the other hand, the presence of a strongly alkaline electrolyte creates other difficulties as compared with a cell with a weakly alkaline, or even neutral electrolyte. Because of the insufficient hydrogen overpotential of the zinc, it must generally be amalgamated and a certain quantity of zinc oxide must be added to the electrolyte. It is also undesirable that, in alkaline solutions, the zinc becomes heavily passivated after passage of a predetermined current quantity per unit of surface. Yet, until now, it was possible to counteract this only through extraordinary enlargement of the zinc surface.

Accordingly, it is an object of the present invention to provide a technique for impeding the passivation which is durably effective and reliable even at high anodic loading of the zinc.

This and other objects which will appear are achieved by including within the electrolyte and/or one or both of the electrodes an additive of soluble chloride and/or sulfate.

Thus it has been found that, for zinc sheets or zinc cups which are anodically loaded with constant current and which exhibit a current limiting property because of increasing coating of their surface, the load can be maintained substantially longer in the current limiting region if there is added to the electrolyte the salts $K_2SO_4$, $Na_2SO_4$, KCl, NaCl, $(NH_4)_2SO_4$ and $NH_4Cl$, either individually or in mixture. Surprisingly, the favorable influence of these additives manifested itself particularly conspicuously at very high lye concentrations, such as at 8n KOH or NaOH.

In addition to the additives previously mentioned, the zinc salts $ZnCl_2$ and $ZnSO_4$ are also suitable. Because zinc-containing electrolyte lyes are frequently used, such additives make unnecessary the otherwise conventional introduction of ZnO.

The load duration capability in the limiting current region, i.e. at the maximum current which it is possible to draw from the electrode while maintaining constant electrode potential, terminates through collapse of the electrode potential (e.g. as measured relative to an Hg/HgO electrode).

Table 1 shows the effect of various additives embodied in the invention upon the load capability at a predetermined limiting current intensity, which has previously been determined through current potential measurements. As test electrodes there were used zinc sheets of spelter with a double-sided active surface of 27.88 cm². The electrolyte was always saturated with ZnO, as well as with the respective additives because these were also present as precipitates.

TABLE 1

| Additive to 365 ml of electrolyte (8nKOH, ZnO-saturated) | Load duration at limiting current intensity of 90 ma/cm² (minutes) |
|---|---|
| without | 8.75 |
| 10g KCl | 10.85 |
| 160g ethylenediamine tetraacetic acid | 0.35 |
| 10g ethylenediamine tetraacetic acid | 7.60 |
| $K_2SO_4$ saturated | 1. loading 17.90 |
| | 2. loading 19.85 |
| | 3. loading 25.13 |
| 10g $NH_4Cl$ | 1. loading 11.12 |
| | 2. loading 13.11 |
| | 3. loading 13.83 |
| 10g$(NH_4)_2SO_4$ | 1. loading 13.71 |
| | 2. loading 16.37 |
| 10g mixture 1:1 KCl + $K_2SO_4$ | 1. loading 14.50 |
| | 2. loading 15.27 |

TABLE 1-continued

| Additive to 365 ml of electrolyte (8nKOH, ZnO-saturated) | Load duration at limiting current intensity of 90 ma/cm$^2$ (minutes) |
|---|---|
| 1g mixture 1:1 KCl + K$_2$SO$_4$ | 1. loading 18.80 |
| | 2. loading 19.61 |
| | 3. loading 19.62 |

The electrode sheets exhibit a white coating in the absence of salt additives embodying the invention. In contrast, in the presence of these additives the coating is characteristically of very dark color and also porous. After current interruption this coating drops off. Upon repeated loading with the same limiting current there are surprisingly observed, as shown in Table 1, longer operating periods than during the first loading. This demonstrates that permanent passivation of the zinc coating has not taken place.

The loose, porous character of the dark coating, and its ready removability point toward certain basic zinc salts which form a "double layer lattice" in which the "main layers" are built up of Zn(OH)$_2$, whereas the "intermediate layers" have the salt ions partly positioned conventionally at fixed points in the lattice, but frequently also introduced in irregular distribution.

Because of these introductions in the intermediate layers, the main layers are spread apart. This causes the main layers to be displaced relative to each other, so that a loosening of the precipitate takes place. It is also known that freshly precipitated zinc hydroxide readily adsorbs foreign ions. This also causes the precipitates to become loosened, or alternatively there does not take place any precipitation upon the zinc sheet. Also these additives can serve as crystallization seeds in the electrolyte.

The loose connection between the electrode sheet and its dark coating indicates with certainty that it was not created by means of an epitaxial growth process. Rather it can be assumed that according to

$$Zn + SO_4^{2-} = ZnSO_4 + 2e^- \quad (4)$$

a primary coating with zinc sulfate takes place. Because this is easily removable, it adheres to the zinc surface for only a limited period of time and thereafter drops off, together with the simultaneously formed Zn(OH)$_2$ or ZnO in the alkaline electrolyte. In so doing, the sulfate ions again become free or else are immediately united into K$_2$SO$_4$ because its solubility in 8n KOH (about 0.5 g/l by our own measurements) is very low.

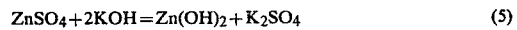
$$ZnSO_4 + 2KOH = Zn(OH)_2 + K_2SO_4 \quad (5)$$

A similar effect as with the additives according to the invention was also to be expected from the ethylenediamine tetraacetate known as "Komplexon" because it forms soluble zinc complex compounds. But on the contrary, as appears from Table 1, the limiting current characteristic is made worse by this additive. Presumably in this instance inhibiting layers are formed which also cover the Zn surface.

The use of additives according to the invention takes place at a concentration in the electrolyte which preferably is close to saturation. To insure achievement of saturating concentration, excess precipitate is present in the electrolyte, so that in some instances the action takes place in the supersaturated region. When (NH$_4$)$_2$SO$_4$ or NH$_4$Cl is used, it is desirable not to introduce the ammonium salt directly into the electrolyte but rather to mix it with the active material of the positive electrode, provided it is formed of a metal oxide from the group MnO$_2$, Ag$_2$O, AgO and HgO.

However, the other salt additives according to the invention can be advantageously built into the positive electrode at least partially and independently of whether the electrolyte is already saturated with them. Since this electrode is mostly made as a pressed powder electrode, the additives reach the electrolyte only little by little. In this manner the positive electrode provides a storage effect.

An important area of application of the additives according to the invention are primarily alkaline zinc/air or zinc/oxygen elements. Their positive electrodes are mainly built up of multiple layers in which, for example, a porous, hydrophobic foil of polytetrafluorethylene is placed on the gas side and a plastic bound, catalytically activated carbon layer faces the electrolyte. It is preferably immobilized with thickening agents such as carboxymethylcellulose or a carboxyvinyl polymer.

The thickened electrolyte itself can preferably serve as storage for the salt additives. This is done by stirring into the initial quantity an excess of the corresponding salt from 0.05 to 10% by weight, and preferably 0.5 to 3% by weight. Use of one of the zinc salts causes no difficulty because no compact Zn(OH)$_2$ deposit can form in the highly viscous alkaline medium. Rather it is present in finely dispersed distribution throughout the entire volume of the electrolyte.

Because of their depassivating effect in alkaline electrolytes, the additives according to the invention deserve consideration primarily in connection with the use of compact Zn electrodes, whose electrochemical capacity had heretofore been inadequate. For partially discharged zinc sheets it was possible to determine by means of weight analyses that the zinc quantity which had entered into the characteristic dark coating and then fallen off the electrode corresponded almost to the coulomb yield achieved during discharge. This also demonstrates that, in the presence of the additives according to the invention, the zinc is not subjected to corrosive attack. Ordinarily, zinc sheets in strong alkaline lye exhibit holes eaten through by corrosion, the cause of which lies in an extensive coverage of the zinc surface by passive layers, which causes the load upon the free regions to increase disproportionately. The additives according to the invention apparently prevent such a sequence of events.

However, the special advantages of the salt additives are not at all limited to compact Zn electrodes. Their depassivating effect is also striking for Zn powder electrodes of higher electrochemical activity. This was shown by tests in which commercially available alkali manganese cells with such electrodes, such as are used for example in flashing light installations, were subjected to a continuous discharge through test resistors of 1 and 2 ohms. In the presence of an additive to these cells of K$_2$SO$_4$ in accordance with the invention their discharge time was able to be extended by about ⅓ beyond the conventional value. The salts from the group of K$_2$SO$_4$, Na$_2$SO$_4$, NaCl, KCl, ZnCl$_2$ and ZnSO$_4$ are also suitable for use as additives in zinc powder electrodes.

I claim:

1. In a galvanic element having a negative zinc electrode and a positive electrode in contact with an aqueous strongly alkaline electrolyte and in which the zinc electrode is subject to passivation on discharge of said galvanic element, the improvement which comprises incorporating in at least one of said electrolyte and negative and positive electrodes at least one additive selected from the group consisting of the soluble chlorides and sulfates and mixtures thereof, the electrolyte containing said additive in an amount in the range from close to saturation to the supersaturation region.

2. In a galvanic element having a negative zinc electrode and a positive electrode in contact with an aqueous strongly alkaline electrolyte and in which the zinc electrode is subject to passivation on discharge of said galvanic element, the improvement which comprises incorporating in at least one of said electrolyte and negative and positive electrodes at least one additive selected from the group consisting of the soluble chlorides and sulfates and mixtures thereof, the electrolyte containing said additive in an amount exceeding the saturation level by about 0.05 to about 10% by weight of said electrolyte.

3. The galvanic element of claim 2 wherein the electrolyte contains said additive in an amount exceeding the saturation level by about 0.5 to about 3% by weight of said electrolyte.

4. In a galvanic element having a negative zinc electrode and a positive electrode in contact with an aqueous strongly alkaline electrolyte and in which the zinc electrode is subject to passivation on discharge of said galvanic element, the improvement which comprises incorporating in at least one of said electrolyte and negative and positive electrodes at least one additive selected from the group consisting of the soluble chlorides and sulfates and mixtures thereof, said additive being present in an amount such that the concentration in the electrolyte is from about 0.2% to the supersaturation region, wherein the additive is incorporated in at least one of said electrolyte and positive electrode and is selected from the group consisting of the alkali metal, ammonium and zinc salts and mixtures thereof.

5. In a galvanic element having a negative zinc electrode and a positive electrode in contact with an aqueous strongly alkaline electrolyte and in which the zinc electrode is subject to passivation on discharge of said galvanic element, the improvement which comprises incorporating in at least one of said electrolyte and negative and positive electrodes at least one additive selected from the group consisting of the soluble chlorides and sulfates and mixtures thereof, said additive being present in an amount such that the concentration in the electrolyte is from about 0.2% to the supersaturation region, the positive electrode comprising a metal oxide selected from the group consisting of $MnO_2$, $Ag_2O$, $AgO$ and $HgO$, wherein the additive is incorporated in the active material of the positive electrode and is selected from the group consisting of $(NH_4)_2SO_4$ and $NH_4Cl$.

6. In a galvanic element having a negative zinc electrode and a positive electrode in contact with an aqueous strongly alkaline electrolyte and in which the zinc electrode is subject to passivation on discharge of said galvanic element, the improvement which comprises incorporating in at least one of said electrolyte and negative and positive electrodes at least one additive selected from the group consisting of the soluble chlorides and sulfates and mixtures thereof, said additive being present in an amount such that the concentration in the electrolyte is from about 0.2% to the supersaturation region, the additive being selected from the group consisting of $K_2SO_4$, $Na_2SO_4$, $NaCl$, $KCl$, $(NH_4)_2SO_4$ and $NH_4Cl$, and mixtures thereof.

7. In a galvanic element having a negative zinc electrode and a positive electrode in contact with an aqueous strongly alkaline electrolyte and in which the zinc electrode is subject to passivation on discharge of said galvanic element, the improvement which comprises incorporating in an least one of said electrolyte and negative and positive electrodes at least one additive selected from the group consisting of the soluble chlorides and sulfates and mixtures thereof, said additive being present in an amount such that the concentration in the electrolyte is from about 0.2% to the supersaturation region, the additive being selected from the group consisting of $ZnCl_2$ and $ZnSO_4$.

8. In a galvanic element having a negative zinc electrode and a positive electrode in contact with an aqueous strongly alkaline electrolyte and in which the zinc electrode is subject to passivation on discharge of said galvanic element, the improvement which comprises incorporating in at least one of said electrolyte and negative and positive electrodes at least one additive selected from the group consisting of the soluble chlorides and sulfates and mixtures thereof, said additive being present in an amount such that the concentration in the electrolyte is from about 0.2% to the supersaturation region, the negative electrode comprising zinc powder, and the negative electrode also comprising an additive selected from the group consisting of $K_2SO_4$, $Na_2SO_4$, $NaCl$, $KCl$, $ZnCl_2$ and $ZnSO_4$.

9. In a galvanic element having a negative zinc electrode and a positive electrode in contact with an aqueous strongly alkaline electrolyte and in which the zinc electrode is subject to passivation on discharge of said galvanic element, the improvement which comprises incorporating in at least one of said electrolyte and negative and positive electrodes at least one additive selected from the group consisting of $K_2SO_4$, $Na_2SO_4$, $NaCl$, $KCl$, $(NH_4)_2SO_4$, $NH_4Cl$, $ZnSO_4$ and mixtures thereof, said additive being present in an amount such that the concentration in the electrolyte is from about 0.2% to the supersaturation region.

* * * * *